United States Patent [19]

Farrell et al.

[11] Patent Number: 5,479,524
[45] Date of Patent: Dec. 26, 1995

[54] METHOD AND APPARATUS FOR IDENTIFYING THE COLOR OF AN IMAGE

[76] Inventors: Joyce E. Farrell; Brian A. Wandell, both of 461 Middle Ct., Menlo Park, Calif. 94025

[21] Appl. No.: 154,144

[22] Filed: Nov. 18, 1993

Related U.S. Application Data

[63] Continuation-in-part of Ser. No. 103,020, Aug. 6, 1993, abandoned.

[51] Int. Cl.⁶ .................................................. G06K 9/46
[52] U.S. Cl. ................................... 382/162; 358/518
[58] Field of Search .................. 382/17, 1; 358/518, 358/505

[56] References Cited

U.S. PATENT DOCUMENTS

| | | | |
|---|---|---|---|
| 4,500,919 | 2/1985 | Schreiber | 358/78 |
| 4,731,663 | 3/1988 | Kovalchick | 382/17 |
| 4,962,540 | 10/1990 | Tsujiuchi | 382/1 |
| 5,010,580 | 4/1991 | Vincent | 382/17 |
| 5,200,817 | 4/1993 | Birnbaum | 358/80 |
| 5,317,648 | 5/1994 | Sawada | 382/17 |

FOREIGN PATENT DOCUMENTS 2257511   1/1993   United Kingdom .............. G01J 3/51

OTHER PUBLICATIONS

S. Suzuki et al., "A Filter–Alternating Color Scanner", Fujitsu Scientific and Technical Journal, vol. 25, No. 4, Jan. 1990, pp. 279–286.

*Primary Examiner*—Yon J. Couso

[57] ABSTRACT

A method and an apparatus to reduce the errors in linearly transforming the RGB values to the XYZ values of the colors of an image. The image is measured twice, once with and once without a filter between the image and the sensors measuring the image. The apparatus is capable of generating at least three output values substantially simultaneously to measure the color of each element of the image.

5 Claims, 5 Drawing Sheets

[ 24 X 6 RGB MATRIX ] × [ 6 X 3 COEFFICIENT MATRIX ] = [ 24 X 3 IDENTIFIED XYZ MATRIX ]

*FIG. 3*

METHOD AND APPARATUS FOR IDENTIFYING THE COLOR OF AN IMAGE

This is a continuation-in-part of U.S. patent application Ser. No. 08/103,020, filed Aug. 6, 1993 now abandoned.

BACKGROUND OF THE INVENTION

The present invention relates generally to color images and more particularly to methods and apparatus for identifying the colors of an image.

The color of every element in an image can be identified by three values, generally known as its XYZ values. Each value corresponds to the spectral information in one spectral band, and the three values together identify the color of an element in the image. The XYZ values depend on the responses of the human eyes and are instrument independent. The values are known as CIE standard responsivities. A general discussion of such standards can be found in "Color Science: Concepts and Methods, Quantitative Data And Formulae," second edition, written by Wyszecki and Stiles, and published by John Wiley and Sons.

Numerous electronic instruments have been used to identify colors of an image. The instruments typically measure the color of each element and identify it by three values, generally known as its RGB or Red-Green-Blue values. The color of each element of the image is identified by measuring the element with three sensors, with each sensor corresponding to one of the three components, red, green or blue. One such instrument is a scanner.

Different instruments have different sensors with different characteristics, which produce different RGB values. Therefore, the RGB values are instrument dependent. It would be very beneficial to transform the instrument dependent RGB values to the instrument independent XYZ values to simplify the hardware and software manipulating the values.

If the RGB values can be transformed to the XYZ values by a three by three matrix with minimal errors, then such a transformation is known as a linear transformation. Instruments capable of performing linear transformation are known as colorimetric instruments.

Prior art inexpensive scanners are quite noncolorimetric. For each element, the calculated or scanner-identified XYZ values are significantly different from the actual XYZ values. Moreover, the errors introduced by the transformation process depend on the media, such as the paper and ink, used to produce the image.

One way to improve on the transformation linearity is to use more sensors to measure each element. Typical scanners employ arrays of charge coupled devices (CCD) as sensors. These CCD arrays are expensive. Using more CCD devices to reduce the errors in the transformation process is a very expensive approach.

There is still a need to improve on the instrument and the method to linearly transform the RGB values to the XYZ values. Further, it would be desirable if the improvement does not incur significant cost.

SUMMARY OF THE INVENTION

The present invention provides an improvement on an instrument and a method of linearly transforming the RGB values to the XYZ values of a color image without incurring significant cost.

As in the prior art, the instrument to identify the colors for an image has many sensors. The instrument, using the sensors, is capable of generating at least three output values substantially simultaneously to measure the color of each element of the image. The present invention improves on the instrument by having a filter and a moving mechanism to position the filter in between the sensors and the image.

The colors of the image are measured sequentially at least two times, once with and once without the filter in between the image and the sensors. In the first measurement, at least some of the elements are measured. In the second measurement, every element in the image is measured. So, the first measurement and the second measurement may have different resolution. The two measurements significantly reduce the errors in linearly transforming the RGB values to the XYZ values, with little additional cost, and significantly improve on the colorimetry of the instrument.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 3 shows a coefficient matrix transforming a RGB matrix into an identified-XYZ matrix.

DESCRIPTION OF THE PREFERRED EMBODIMENT

The present invention significantly reduces the errors in linearly transforming the RGB values to the XYZ values of a color image with little additional cost.

Figure 1:
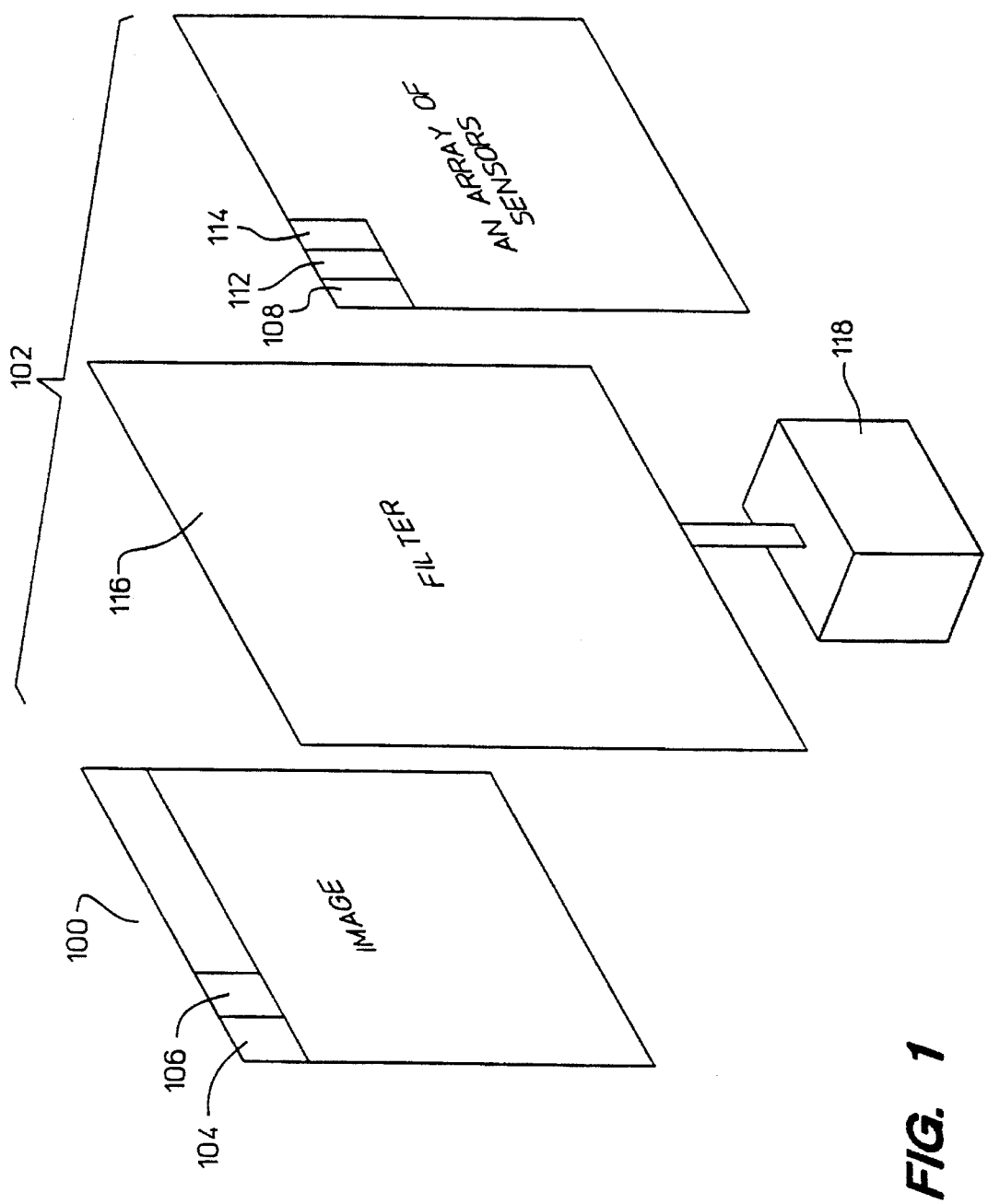
FIG. 1 shows a preferred embodiment of the present invention measuring a color image.

FIG. 1 shows a preferred embodiment of the pertinent part of an instrument 102 of the present invention identifying the colors of an image 100. Many components of the instrument 102 are not shown in the figure; they should be obvious to those with ordinary skill in the art. The image 102 has one or more elements, such as 104 and 106. Each element has a color.

The instrument 102 has a plurality of sensors, such as 108, 112 and 114. The sensors may be arranged as a one or two dimensional array. The instrument, using the sensors, is capable of generating at least three output values substantially simultaneously to measure the color of each element. For example, the sensors 108, 112 and 114, each provides an output value for the element 104 of the image 100. In one preferred embodiment, the instrument is a scanner, and the three output values correspond to the intensities of the red, green and blue components of the color of the element 104. This can be achieved by having red, green and blue filters permanently positioned in front of the corresponding sensors.

The instrument 102 also preferably has a filter 116 and a moving mechanism 118 to position the filter 116 at different positions, such as in between the sensors 108, 112 and 114, and the image 100. Different moving mechanisms 118 are suitable for the present invention. These mechanisms are obvious to those with ordinary skill in the art and will not be further described in the specification.

The colors of the image 100 is measured sequentially at least twice, once with and once without the filter 116 in between the image 100 and the sensors 108, 112 and 114. The sequential measurements identify the color of each element 104 of the image 100.

In one preferred embodiment, the first measurement is performed without the filter 116. Each element 104 of the image 100 is measured by three sensors. Each sensor provides one output value for the element. The three sensors substantially simultaneously provide the output values corresponding to the red, green and blue components of the color of the element. The second measurement is performed with the filter 116 in between the sensors 108 and the image 100. Each element 104 of the image 100 is again measured by three sensors to provide three output values. Thus, every element of the image 100 is characterized by six output values.

In another preferred embodiment, the first measurement is performed with the filter 116, providing output values for some of the elements of the image 100. The output values of the elements that are not measured are generated from the output values of those elements that are measured. The generation process can be by interpolation between the measured elements or by other means obvious to those with ordinary skill in the art. Each element is measured by one sensor, instead of three. After the first measurement, the second measurement is performed without the filter 116, providing three output values for each element of the image 100. The number of bits representing the output values in the first measurement can be less than the number of bits representing the output values in the second measurement. This may provide a lower intensity resolution for the first measurement. Also, the first measurement have a lower spatial resolution than the second measurements; for example, the first measurement provides a spatial resolution of 100 output-values-per-inch of the image, while the second provides a spatial resolution of 300 output-values-per-inch of the image. With the first and second measurements, every element of the image 100 is characterized by four output values.

The present specification has only described the embodiments with four or six output values for each element. It should be obvious that other numbers of output values and other spatial and intensity resolutions are also suitable for this invention.

Figure 2:
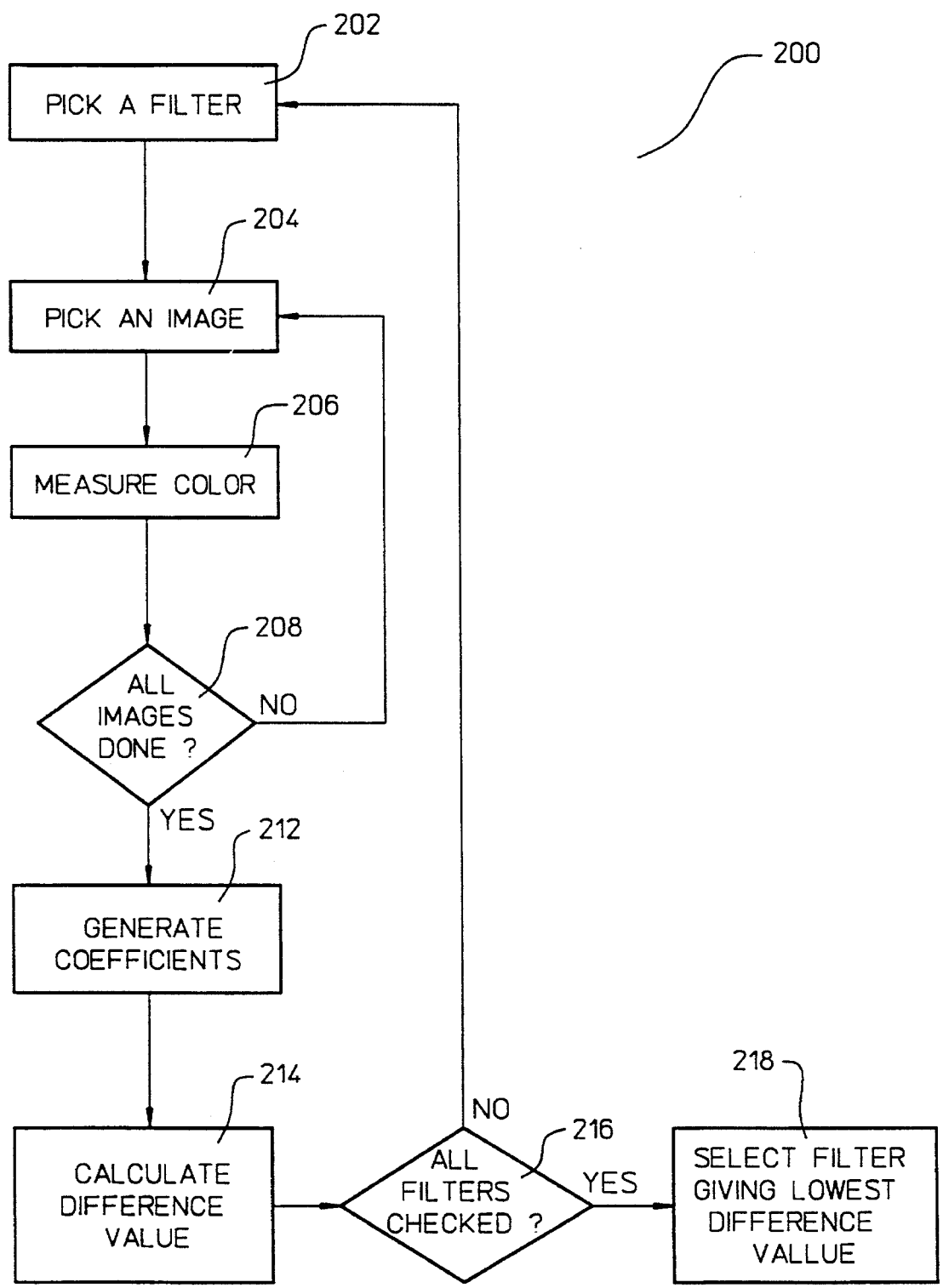
FIG. 2 shows preferred steps to select a filter for the present invention.

FIG. 2 shows preferred steps 200 to select the filter 116. A group of commercially available filters are designated as pre-selected filters. This group of filters may be a set specified by Spectral Curves No. 9081 from Edmund Scientific Company. In fact, the group of filters may be any group of filters with different bandwidth and filter response.

Another group of commercially available images are designated as pre-selected images. Each pre-selected image has a color whose XYZ values have previously been calibrated and are known. All the pre-selected images have different colors. One example of the group of pre-selected images is the twenty-four MacBeth Color-Checker color patches. Other pre-selected images may be used as long as the XYZ values of the images have been calibrated and are known.

One filter is picked, 202, from the group of pre-selected filters for the instrument. The instrument then identifies the colors of all the pre-selected images.

The identification process starts from picking, 204, a pre-selected image from the group of pre-selected images. The color of the pre-selected image is measured by the sensors in the instrument 102 as described above to identify the color of the pre-selected image. With the MacBeth color patches, the entire pre-selected image is of the same color, and is characterized by four or more output values.

The process repeats, 208, until all the pre-selected images have been measured. If there are twenty-four pre-selected images and each image is characterized by six output values, a twenty-four by six matrix of output values are created. Each row in the matrix corresponds to the output values of one pre-selected image. All the output values correspond to the RGB values of the pre-selected images so the matrix is called a RGB matrix. The XYZ values of the pre-selected images are previously known and can be represented in a twenty-four by three known-XYZ matrix.

The next step is to generate, 212, a set of coefficients to linearly transform the output values as close to their corresponding known XYZ values as possible. In other words, in the present example, the next step is to find a six by three matrix of coefficients that would transform as closely as possible the twenty-four by six RGB matrix into the twenty-four by three known-XYZ matrix.

FIG. 3 shows the three matrices, the RGB matrix, 300, the coefficient matrix, 302, and the identified-XYZ matrix 304. The identified-XYZ 304 is generated by multiplying the RGB matrix 300 to the coefficient matrix, 302. Each row in the matrices correspond to one specific color patch. The coefficient matrix, 302, can be generated by the standard methods of linear regression, minimizing the root-mean-squared errors between identified-XYZ matrix, 304, and the known-XYZ matrix. A general discussion of the linear regression methods to generate the coefficients can be found in the following two references: "Data Analysis and Regression," written by Mosteller and Tukey, and published by Addison Wesley in 1977; and "Solving Least Squares Problems," written by Lawson and Hanson, and published by Prentice-Hall in 1974. The linear regression methods will not be further described in the specification.

Another method to generate the coefficient matrix, 302, is by a search procedure minimizing Delta E errors between the identified-XYZ matrix, 304, and the known-XYZ matrix. The term, Delta E, is an industry standard. It quantifies the difference between two sets of XYZ values. A general discussion on Delta E can be found in "Color Science: Concepts and Methods, Quantitative Data And Formulae" by Wyszecki and Stiles, supra. An example of a search procedure is the program "Stepit," written by Chandler from the Indiana University, and distributed by Quantum Chemistry Exchange of the Department of Chemistry of the Indiana University. The program is incorporated by reference into the specification. In contrast to the linear regression methods, this search procedure does not guarantee that the coefficient matrix corresponds to the global minimum solution. This problem of producing a local minimum solution may be circumvented by starting the search with different initial values for the coefficient matrix. Other search routines may be used. Since it is obvious to those with ordinary skill in the art, the search procedure will not be further described in the specification.

From the RGB matrix 300, and the generated coefficient matrix 302, the identified-XYZ matrix is generated. This identified-XYZ matrix may not be the same as the known-XYZ matrix. Their difference may be quantified to generate, 214, a difference value by a number of different methods. For example, one method sums all the root-mean-square differences between the identified-XYZ values and the known XYZ values of each color patch to produce the difference value. Another method sums all the Delta E errors between the identified-XYZ values and the known XYZ values of each color patch to produce the difference value. A third method specifies the difference value as the largest Delta E error among all the Delta E errors between the identified-XYZ values and their corresponding known XYZ values.

The above steps to get the difference value is repeated, 216, for every filter in the group of pre-selected filters. From the group of pre-selected filters, the filter that provides the minimal difference value is chosen, 218, to be the preferred filter, 116, of the present invention.

Figure 4:
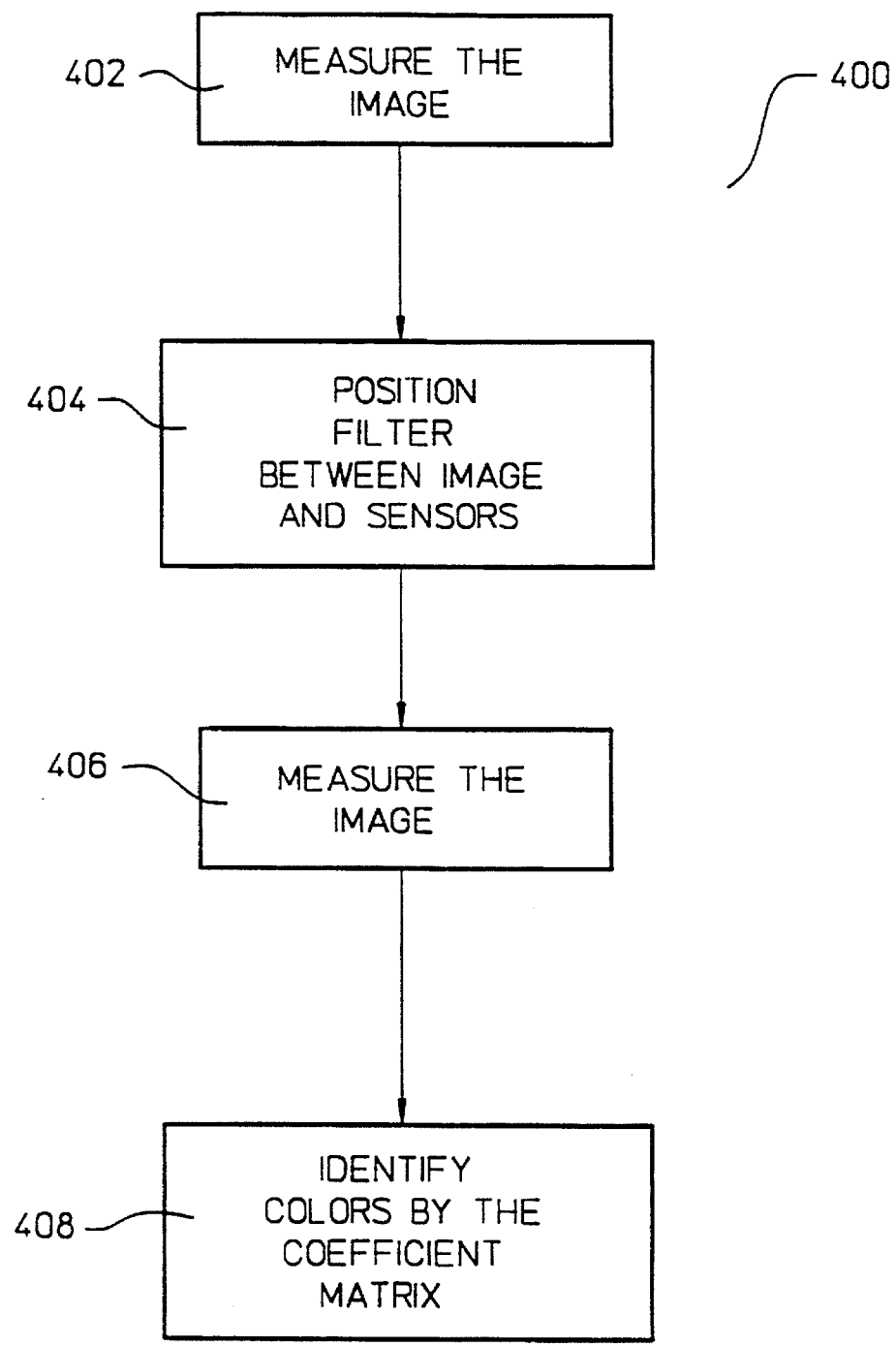
FIG. 4 shows the steps of the present invention to identify the colors of an image.

FIG. 4 shows the steps 400 to identify the colors of the image 100. The instrument 102 first measures, 02, the colors of the image 100 by generating at least three output values substantially simultaneously for each element 104 of the image 100. Then the moving mechanism 118 positions, 404, the filter 116 in between the sensors 108, 112 and the image 100. With the filter 116 in place, the colors of the image is again measured, 406, by the instrument 102. In the second measurement, another set of output values are produced for the elements of the image 100. From the output values, the color of each element of the image 100 is identified based on the coefficient matrix of the filter, 116. In one preferred embodiment, each element of the image 100 is characterized by six output values, which are RGB values. The six RGB values are transformed by the coefficient matrix into the three XYZ values to identify the color of its corresponding element.

The invention will be further clarified by a consideration of the following example, which is intended to be purely exemplary of the use of the invention.

Figure 5:
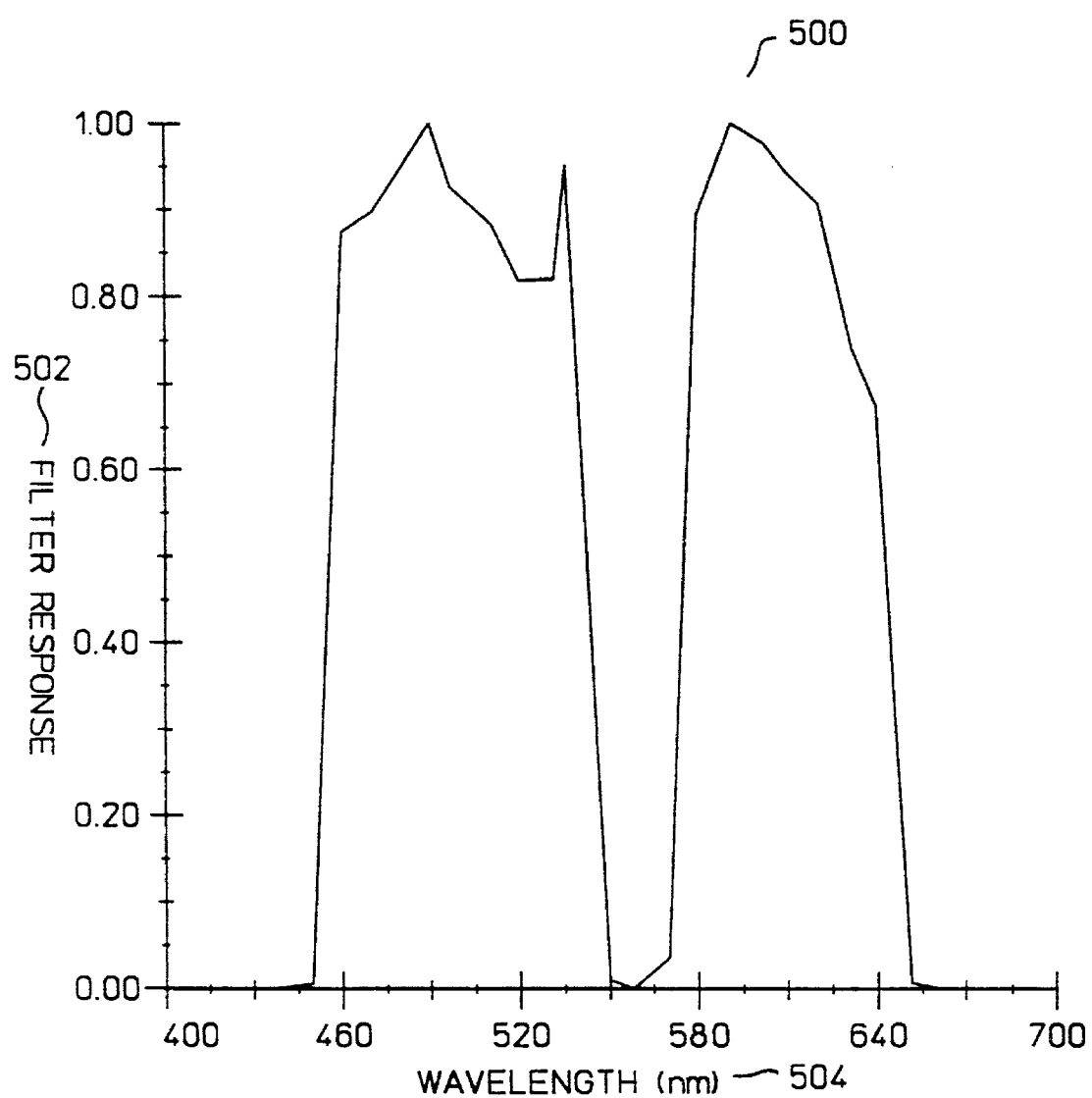
FIG. 5 shows the response of a filter for the present invention.

The instrument 102 is simulated to be an improved Hewlett Packard Scanjet IIC scanner by having a filter. FIG. 5 shows the filter response 500 of the filter selected for this example. The graph 500 plots the amount of light transmitted, 502, as a function of the wavelength, 504, of the light. For the amount of light transmitted as shown in the graph 500, one implies all the light being transmitted and zero implies all the light being blocked by the filter. The filter is placed in between the sensors in the instrument 102 and the image, and is simulated as part of the scanner. The instrument 102 is used to identify the twenty-four MacBeth ColorChecker color patches under a desired illuminant (CIE standard Illuminant C). The results of the identifications are compared to the results of the Scanjet IIC scanner before the improvement.

Table one shows the results of simulated measurements before and after the improvement. The first column specifies each color of the twenty-four MacBeth ColorChecker color patches, the second column specifies the Delta E errors in the Scanjet IIC scanner before the improvement, and the third column specifies the Delta E errors after the improvement. Two color patches with their Delta E value differs by more than 5 are visibly detectable to be different. Thus, a CIE standard specifies that two color patches are colorimetrically matched if their Delta E value is less than 5. As shown in Table one, before the improvements or without the filter, the Scanjet IIC scanner can give Delta E errors as high as 20. After the improvements or with the filter as applied to the present invention, the Delta E errors are less than 3. It has also been found empirically that the Delta E errors of the present invention is approximately independent of the media, such as the paper and ink, used to produce the image.

Another preferred embodiment of the present invention uses transparencies instead of filters. In this embodiment, a preferred transparency is chosen for a scanner by first having the scanner scan some previously calibrated color patches, such as the twenty-four MacBeth ColorChecker color patches. Then the color patches are scanned again with each of a pre-selected group of transparencies in between the patches and the scanner. One example of the group of transparencies is the 8" by 10" commercially available, Edmund Scientific transparencies, with the part number N70,638. There are 44 transparencies in the group. Any other groups of transparencies may be applicable as long as there are enough transparencies with different spectral transmittances. Based on the measured values with and without the transparencies, the specific transparency providing the minimal difference value for the color patches is chosen to be the preferred transparency for this embodiment.

The scanner and the preferred transparency can then be used to provide, for example, the XYZ values of different color images. Again this can be done by scanning a color image with the scanner, once without and once with the preferred transparency between the image and the scanner. This two part scanning would again significantly reduce the amount of error in generated XYZ values. The XYZ values may then be sent to a printer or a display to have the images reproduced.

The present invention can be extended to more than one transparency or filter. As an example, if the goal is to select two filters out of the group of pre-selected filters, then, based on FIG. 2, instead of picking the filter to give the lowest difference value, one selects two filters that give the lowest difference value. The step 202 in FIG. 2 is modified to pick two filters out of the group. An image is then measured first without a filter, then with each of the two filters to produce, for example, nine output values. After all the images are measured, a nine by three coefficient matrix and its difference value are calculated. The above process is repeated for all combinations of two filters out of the group of pre-selected filters. The two filters giving the lowest difference value are selected. More filters or transparencies may be used.

The present invention reduces the errors in linearly transforming the RGB values to the XYZ values of a color image without incurring significant cost. All that is required for the improvement is to have one more filter in between the image and the sensors measuring the image, and to measure the image more than once.

Other embodiments of the invention will be apparent to the skilled in the art from a consideration of this specification or practice of the invention disclosed herein. All references recited in the specification are incorporated by reference. It is intended that the specification and examples be considered as exemplary only, with the true scope and spirit of the invention being indicated by the following claims.

TABLE ONE

| MacBeth color patch | Scanjet IIC | Modified Scanjet |
|---|---|---|
| Bluish Green | 13.1 | 1.51 |
| Blue Flower | 2.61 | 0.57 |
| Foliage | 7.86 | 0.72 |
| Blue Sky | 6.43 | 1.39 |
| Light Skin | 5.32 | 0.71 |
| Dark Skin | 3.18 | 0.80 |
| Orange Yellow | 7.02 | 2.13 |
| Yellow Green | 8.13 | 1.90 |
| Purple | 9.63 | 0.99 |

TABLE ONE-continued

| MacBeth color patch | Scanjet IIC | Modified Scanjet |
|---|---|---|
| Moderate Red | 4.53 | 2.52 |
| Purplish Blue | 11.42 | 2.66 |
| Orange | 8.75 | 1.85 |
| Cyan | 15.58 | 1.11 |
| Magenta | 2.86 | 0.90 |
| Yellow | 1.69 | 1.90 |
| Red | 20.30 | 1.63 |
| Green | 11.87 | 1.26 |
| Blue | 17.24 | 0.67 |
| Neutral 3.5 | 2.45 | 0.89 |
| Neutral 5.0 | 3.06 | 0.97 |
| Neutral 6.5 | 3.29 | 0.78 |
| Neutral 8.0 | 3.00 | 1.02 |
| White | 3.12 | 0.99 |
| Black | 1.87 | 2.07 |

We claim:

1. An instrument to identify the colors for an image, the image having one or more elements, each element having a color the instrument comprising:

a plurality of sensors;

a filter; and means for moving the filter so that the filter can be positioned in between the sensors and the image;

such that the instrument is capable of generating at least three output values to measure the color of each element;

the colors of the image are measured sequentially at least twice, once with and once without the filter in between the image and the sensors, to identify the color of each element of the image; and wherein the filter is selected by the steps of:

picking a filter from a plurality of pre-selected filters for the instrument;

identifying the colors of a plurality of pre-selected images by the instrument, the color of each pre-selected image being known and different from the other pre-selected images;

calculating a difference value based on the difference between the identified color and the known color of each pre-selected image;

repeating the step of "picking a filter" until every pre-selected filter has been picked; and selecting the filter that provides the minimal difference value.

2. An instrument as recited in claim 1 wherein the step of "identifying the colors" further comprises the step of:

picking a pre-selected image from the plurality of pre-selected images;

measuring the color of the pre-selected image by the instrument to identify the color of the pre-selected image;

repeating the step of "picking a pre-selected image" until every pre-selected image has been measured; and generating a set of coefficients that manipulates the output values from the measurements so that the measured color of each pre-selected image identifies as close to the known color of that pre-selected image as possible.

3. An instrument as recited in claim 2 wherein each of the sequential measurements provides three output values for each element.

4. An instrument as recited in claim 3 wherein the set of coefficients has eighteen values.

5. A method of identifying the colors of an image, the image having one or more elements, each element having a color, the method comprising the steps of:

generating at least one output value for the color of each element that is measured;

positioning a filter in between the image and the sensors measuring the image;

generating at least three output values for the color of each element; and identifying the color of each element of the image based on manipulating the output values of that element by a set of coefficients;

wherein the set of coefficients is generated by the steps of:

picking a pre-selected image from a plurality of pre-selected images;

measuring the color of the pre-selected image by the method to identify the color of the pre-selected image;

repeating the step of "picking a pre-selected image" until every pre-selected image has been measured; and generating the set of coefficients that manipulates the output values from the measurements so that the measured color of each pre-selected image identifies as close to the known color of that pre-selected image as possible.

* * * * *